United States Patent [19]

Takahashi et al.

[11] 4,393,720
[45] Jul. 19, 1983

[54] BALL-CIRCULATION TYPE LIQUID FLOW RATE SENSOR

[75] Inventors: Toru Takahashi, Mito; Sadayasu Ueno, Katsuta, both of Japan

[73] Assignee: Hitachi, Ltd., Tokyo, Japan

[21] Appl. No.: 305,387

[22] Filed: Sep. 24, 1981

[30] Foreign Application Priority Data

Sep. 24, 1980 [JP] Japan ................................ 55-131634

[51] Int. Cl.³ .............................................. G01F 1/70
[52] U.S. Cl. ................................................ 73/861.05
[58] Field of Search ................ 73/255, 861.05, 861.32

[56] References Cited

U.S. PATENT DOCUMENTS 4,118,980 10/1978 Debeaux ........................... 73/861.05
4,157,660 6/1979 Spacen ............................. 73/861.05
4,263,812 4/1981 Zeigner ............................ 73/861.05

Primary Examiner—Herbert Goldstein
Attorney, Agent, or Firm—Antonelli, Terry & Wands

[57] ABSTRACT

A flow rate sensor having an annular passage for enabling a flow of liquid therethrough and a movable member disposed in the annular passage. An intake passage is provided for supplying liquid to the annular passage and an outlet passage, disposed concentrically to the intake passage, enables the liquid to flow out of the annular passage about an outer periphery of the intake passage.

16 Claims, 10 Drawing Figures

BALL-CIRCULATION TYPE LIQUID FLOW RATE SENSOR

The present invention relates to a sensor and, more particularly, to a ball-circulation type liquid flow rate sensor which may be employed as a fuel flow rate sensor for a motor vehicle.

In an attempt to reduce the fuel consumption in motor vehicles, so-called driving computer systems have become increasingly popular. The driving computer system is a device which is adapted to momentarily displace information such as, for example, fuel consumption, amount of remaining fuel, fuel consumption rate, distance to go until empty, distance since last fill up, elapsed time of trip, remaining travel time before fuel is exhausted, etc.

Since the driving computer system is to be mounted in motor vehicles, it is essential that each component be relatively lightweight and, due to the relatively limited installation space in a motor vehicle, each component is also to be of a relatively small size. Moreover, for practical reasons, it is desirable that the overall system is relatively inexpensive.

It is also an essential requirement that the drive computer system does not, in any manner, adversely affect the operating performance of the motor vehicle such as, for example, the acceleration capabilities or characteristics of the motor vehicle.

In order to meet the above-noted requirements, various types of ball-circulation flow rate sensors have been proposed as a means of measuring a flow rate of the fuel for the driving computer systems.

In, for example, U.S. Pat. No. 4,118,980 and corresponding Japanese laid-open patent application 54-27463 (1979), a ball-circulation type flow rate sensor is proposed wherein an inlet passage is provided which opens into an outer peripheral portion of an annular passage accommodating a ball, with an outlet passage, opening into an inner peripheral portion of the annular passage.

In this proposed construction, in order to position both openings as close as possible to each other while nevertheless avoiding any shortcircuiting of the liquid, a distance between the closest opposing edges of the openings of the inlet and outlet passages is substantially equal to one half of a diameter of the ball so that the liquid introduced into the annular passage may flow as long a distance as possible in the annular passage before it is discharged.

A disadvantage of the above-noted proposed construction resides in the fact that it is extremely difficult to reduce the size of the flow rate sensor without increasing the flow resistance since the opening of the outlet passage opens in the inner periphery of the annular passage.

Since a restriction in size is extremely difficult without adversely affecting the operation of the above-noted proposed flow rate sensor, a further disadvantage resides in the fact that the required size for a proper functioning of the flow rate sensor does not readily lend itself for mounting in a motor vehicle.

In U.S. Pat. No. 4,157,660, another flow rate sensor is proposed wherein an outlet passage opens in an outer peripheral portion of the annular passage in tangential directions to the annular passage, with an angle formed at a point of intersection of the longitudinal axes of both openings and a center axis or circular axis of the annular passage being selected to be about 180°.

While the last-mentioned proposed arrangement permits a reduction of the size of the flow rate sensor as a whole without resulting in a substantial increase in the flow rate resistance, a disadvantage resides in the fact that the operation of the flow rate sensor tends to fail in predetermined angular ranges so that the flow rate of the fuel cannot be sensed when the flow rate of the fuel is small such as would occur in the case of an idling operation of the motor vehicle.

The aim underlying the present invention essentially resides in providing a ball-circulation type flow rate sensor having a lowered flow resistance and being capable of sensing even small flow rates.

In accordance with advantageous features of the present invention, a liquid flow rate sensor is provided having an annular passage adapted to accommodate a movable member, with passage means for introducing liquid into and discharging liquid from the annular passage, and means for detecting a rotation or movement of the movable element in the annular passage to provide an indication of a flow rate of the liquid. The passage means includes an intake passage or inlet orifice disposed on the outer periphery of the annular passage for enabling the liquid to be measured to flow into the annular passage, and an outlet orifice or discharge passage, disposed concentrically with respect to the inlet passage, for enabling the liquid to flow out of the annular passage through or around the outer periphery of the intake passage or inlet orifice.

By virtue of the provision of the intake passage opening into the outer periphery of the annular passage in accordance with the present invention, it is possible to reduce the overall size of the flow rate sensor as compared with the previously proposed flow rate sensors. Likewise, by providing that the discharge passage opens in the outer periphery of the annular passage and is disposed concentrically with respect to the intake passage, it is possible for the flow rate sensor to accurately sense even small flow rates.

In accordance with further features of the present invention, the inlet orifice is arranged so as to be tangential with respect to the annular passage whereby the liquid to be measured or sensed is introduced into the annular passage in a tangential direction.

At least a portion of a tip or end of the inlet orifice or intake passage may, in accordance with the present invention, terminate in the outer periphery of the annular passage; however, it is also possible for at least a portion of the tip or end of the inlet orifice to be spaced a predetermined distance from the outer periphery of the annular passage.

Advantageously, in accordance with still further features of the present invention, the flow rate sensor may be formed by an inlet body and outlet body in which are respectively sealingly mounted a light transmitting element and a light receiving element forming the detecting means for detecting the movement of the movable element which, for example, may be formed as a ball element. The annular passage is preferably formed by an annular groove formed in each of the faces of the inlet and outlet bodies along which the bodies are to be joined. By virtue of these features of the present invention, it is possible to suitably form the flow rate sensor by die-casting or molding.

In order to readily absorb a pulsation of the fuel pressure as supplied by a fuel pump, which pulsation is generally attributable to a normal operation of the fuel pump, according to the present invention, the inlet and outlet bodies are respectively provided with an inlet pressure chamber and an outlet pressure chamber, with the respective pressure chambers being separated by a resilient membrane such as, for example, a diaphragm.

For a driving computer system, the flow rate sensor of the present invention may be arranged in a fuel supply line between the fuel pump and a carburetor, whereby the fuel from the fuel supply line enters the annular passage through the inlet orifice causing the movable element to be displaced through the annular passage in accordance with the fuel flow. A light transmitting and light receiving elements monitor the movement of the movable element and provide an appropriate output signal to the driving computer which, in turn, converts the received signal and provides an appropriate indication of, for example, fuel comsumption fuel remaining, etc.

Accordingly, it is an object of the present invention to provide a flow rate sensor which avoids, by simple means, shortcomings and disadvantages encountered in the prior art.

Another object of the present invention resides in providing a flow rate sensor having a relatively small size and being of relatively light weight.

Yet another object of the present invention resides in providing a ball-circulation type flow rate sensor which is operable even in response to a small flow rate.

A further object of the present invention resides in providing a ball-circulation type flow rate sensor which does not substantially increase the flow resistance of the liquid flowing through the sensor.

A still further object of the invention resides in providing a ball-circulation type flow rate sensor which greatly improves the accuracy of an operation of a drive computer system for a motor vehicle.

Another object of the present invention resides in providing a ball-type flow rate sensor which functions reliably under all flow rate conditions.

These and other objects, features and advantages of the present invention will become more apparent from the following description when taken in connection with the accompanying drawings which show, for the purposes of illustration only, one embodiment in accordance with the present invention, and wherein.

Figure 1:
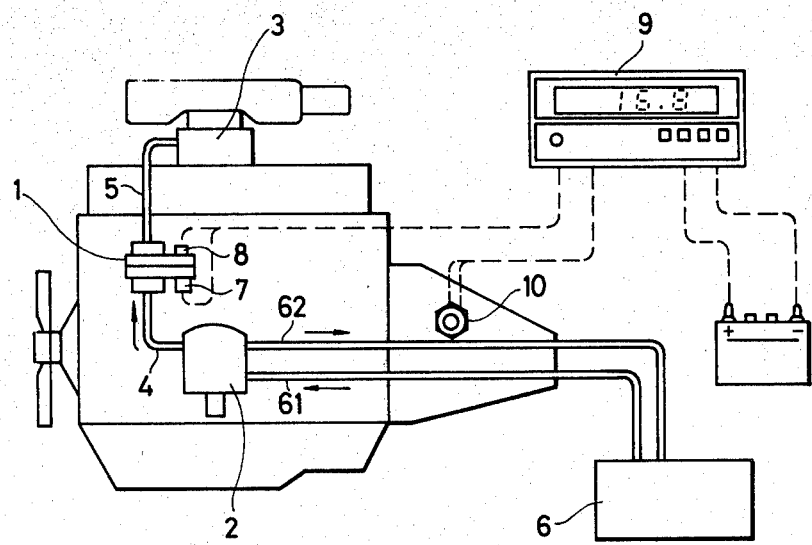
FIG. 1 is a partially schematic view of a drive computer system for a motor vehicle having incorporated therein a flow rate sensor constructed in accordance with the present invention.

Referring now to the drawings wherein like reference numerals are used throughout the various views to designate like parts and, more particularly, to FIG. 1, according to this figure, a drive computer system 9, of conventional construction, for a motor vehicle is adapted to calculate and display various data such as, for example, fuel consumption, fuel remaining, distance to go before a fuel supply is exhausted, etc. upon receipt of signals from, for example, a ball-circulation type fuel flow rate sensor 1 and an engine speed sensor 10 connected to, for example, a speedometer cable or the like.

A fuel line formed of an inlet fuel line 4 and an outlet fuel line 5 is arranged between a fuel pump 2 and a carburetor 3, with the fuel rate sensor 1 being arranged in the fuel line 4, 5. A fuel supply line 61 is arranged between a fuel tank 6 and the fuel pump 2, with an outlet or fuel return line 62 being disposed between the fuel pump 2 and the fuel tank 6. A light emitting element 7, of conventional construction, and a light receiving element 8, of conventional construction, are arranged at the fuel flow rate sensor 1.

Figure 2:
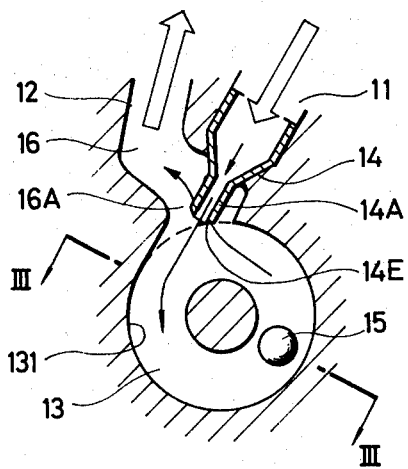
FIG. 2 is a partially schematic cross-sectional view, on an enlarged scale, of a portion of the flow rate sensor constructed in accordance with the present invention.
Figure 3:
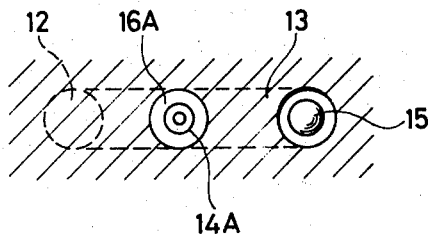
FIG. 3 is a cross-sectional view taken along the line III—III in FIG. 2.

As shown most clearly in FIGS. 2 and 3, the flow rate sensor 1 includes an annular passage 13, a fuel intake passage or inlet orifice 14 connected to the fuel line 4, and an outlet orifice or discharge passage 16 connected to the fuel line 5. A longitudinal center axis of the fuel inlet orifice 14 intersects an outer side of the annular passage 13. An end or tip 14E of the inlet orifice 14 is positioned so that at least a portion thereof is disposed in an extension or continuation, indicated in phantom line in FIG. 2, of the outer periphery 131 of the annular passage 13. The outlet orifice or discharge passage 16 includes an opening area 16A, with the opening area 16A being disposed so as to permit liquid to flow out of the annular passage 13 about or through the outer periphery of the tip or end 14E of the inlet orifice 14.

As shown in FIG. 2, the inlet orifice 14 at a discharge end thereof is reduced to a smaller cross-sectional area 14A. The opening area 16A of the outlet orifice 16 is widened in an area of the inlet orifice 14; however, by virtue of the disposition of the tip or end 14E of the inlet orifice 14 in the opening area 16A, even though the opening area 16A is widened, the ball 15 is prevented from entering the outlet orifice 16.

In operation of the flow rate sensor 1, the liquid is restricted as it passes from the fuel line 4 through the fuel inlet orifice 14 and is discharged from the fuel inlet orifice 14 as a liquid jet. The liquid jet discharged from the fuel inlet orifice 14 then flows through the annular passage 13 and reaches the opening area 16A of the outlet orifice 16. Since the outlet orifice 16 has an opening area 16A greater at least than the restricted cross-sectional area 14A of the end portion of the fuel inlet orifice 14, the energy of the counterflow of the liquid is so small that it does not overcome the energy of the jet flow of liquid being discharged from the inlet orifice 14. Accordingly, with this flow arrangement, the ball 15 circulates quite smoothly even when the flow rate is reduced to a low level so that there is no region in the flow rate sensor 1 subject to an operation or flow failure.

Figure 4:
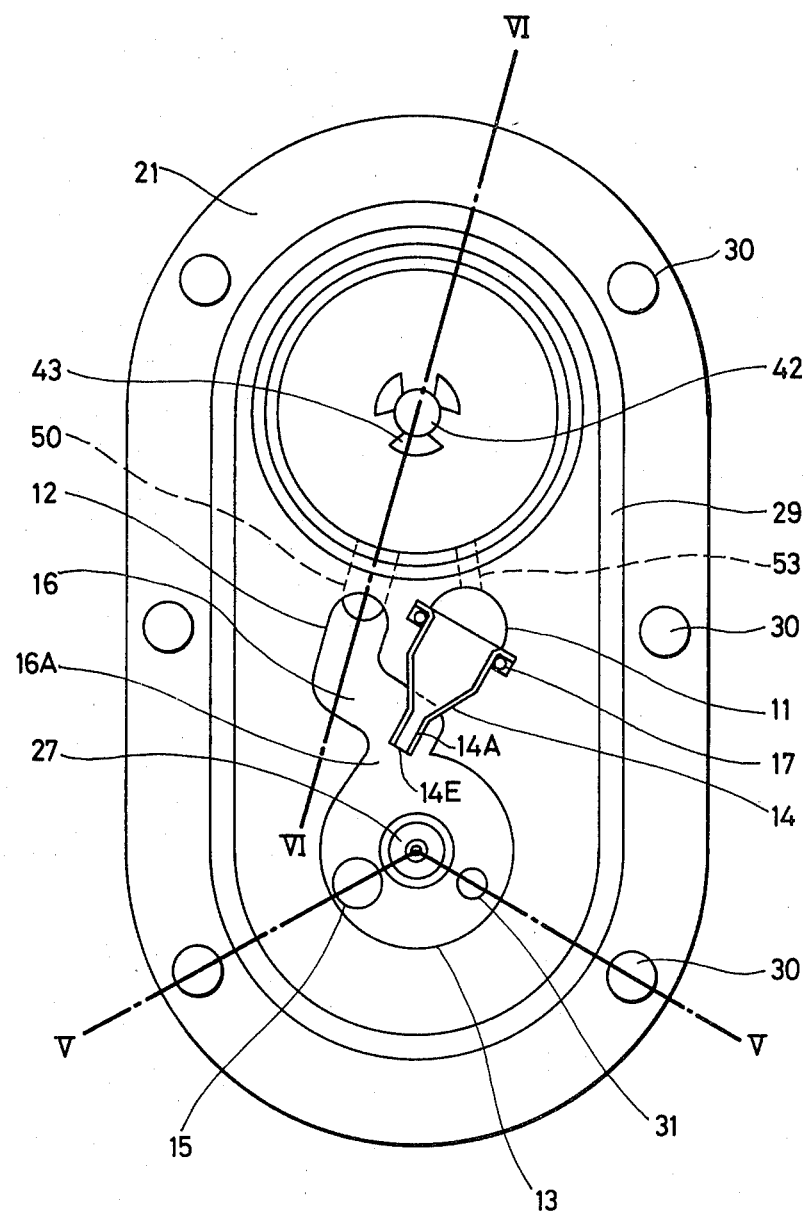
FIG. 4 is a schematic plan view of an entire flow rate sensor constructed in accordance with the present invention.
Figure 5:
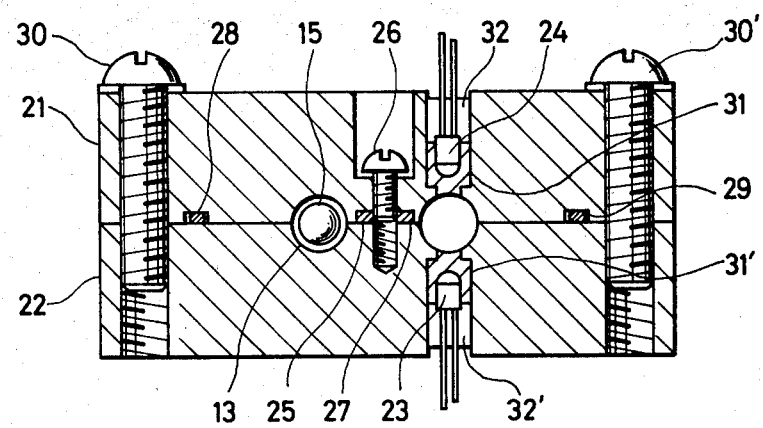
FIG. 5 is a cross-sectional view taken along the line V—V in FIG. 4.

As shown most clearly in FIGS. 4 and 5, the ball-circulation type flow rate sensor 1 is formed by an outlet body 21 and an inlet body 22. The light emitting element 7 and associated light transmitting window 31' are arranged in the inlet body 22, with the light receiving element 8 and associated light transmitting window 31 being arranged in the outlet body 21. Sealing means 32, 32' are provided for respectively mounting an sealing the light emitting element and the light receiving element 8 in the inlet and outlet bodies 22, 21. The light emitting element 7 and light receiving element 8 are adapted to detect every passing of the ball 15, whereby an electrical output signal proportional to the fluid flow or volume flow is supplied or fed to the drive computer system 9.

The outlet body 21 is provided with a groove or recess for accommodating a center "O" ring 25 and a further groove or recess 29 for accommodating an outer "O" ring 28. As is readily apparent, the purpose of the "O" rings 25, 28 is to seal the respective joints formed between the bodies 21, 22 and a further "O" ring 17 is provided for sealingly mounting the fuel inlet orifice 14 in the fuel rate sensor 1. A fastening means such as, for example, a bolt or screw 26 fastens or attaches the inlet and outlet bodies 22, 21, to each other in a center area of the flow rate sensor 1. Additional fastening means in the form of, for example, bolts 30 are arranged about the periphery of the flow rate sensor 1. Thus, the center bolt or screw 26 and additional bolts or screws 30 function to maintain the sensor 1 in an assembled condition.

A passage accommodating the inlet orifice 14, and the outlet orifice or discharge passage as well as the annular passage 13 are formed in the outlet body 21 and inlet body 22, respectively. The annular passage is formed by annular grooves provided in the outlet body 21 and inlet body 22 along surfaces thereof which are joined when the flow rate sensor 1 is assembled.

Figure 6:
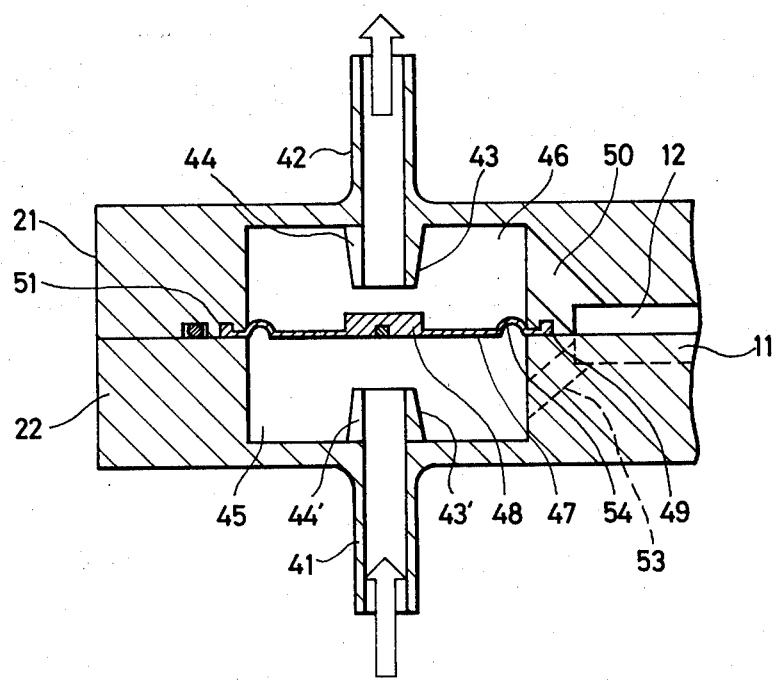
FIG. 6 is a cross-sectional view taken along the line VI—VI in FIG. 4.

As shown most clearly in FIG. 6, the outlet body 21 and inlet body 22 also include an inlet pressure chamber 45 and an outlet pressure chamber 46, with the pressure chambers 45, 46 being separated by a diaphragm 47. The outlet body 21 is formed with an outlet passage 50 and a further passage 12 which communicates the outlet passage 50 with the outlet orifice 16. Groove 51 is formed in the outlet body 21 for accommodating a diaphragm bead 49. An outlet pipe 42 is formed on the outlet body 21 and serves as a connecting pipe for the fuel line 5, with the outlet pipe 42 having a screen or baffle portion 43 and a side opening or hole 44.

The inlet body 22 is formed with an inlet passage 53 and a further passage 11 for communicating the inlet passage 53 with the inlet orifice 14. An inlet pipe 41 is formed on the inlet body 22 and serves as a connecting pipe for the fuel line 4, with the inlet pipe 41 having a side opening or hole 44' and a baffle or screen 43'. By virtue of the above-noted features of the inlet body 22 and outlet body 21, both bodies can be suitably formed by a die-casting or molding operation.

The diaphragm 47 is formed from a suitable fuel resistant material of, for example, rubber or a synthetic material, with the material also having a high flexibility. The diaphragm 47, in addition to the diaphragm bead 49, includes a disc 48 and a semicircular groove 54. The diaphragm 47 is adapted to absorb a pulsation of pressure of fuel attributable to the operation of the fuel pump 2. The ball 15, accommodated in the annular passage 13, has an outside diameter which is less than an inside diameter of the annular passage 13. The ball 15 preferably has a specific weight which is approximately equal to a specific weight of the fuel, i.e., gasoline. Consequently, it is advantageous if the ball 15 is formed from, for example, a foamed plastic material.

The light transmitting windows 31, 31' are made of a material which permits the light beam from the light emitting element 7 to pass therethrough and reach the light receiving element 8. Advantageously, the windows 31, 31' are made of a glass or transparent nylon. The light transmitting windows 31, 31' are respectively placed together with the light transmitting element 7 and light receiving element 8 in the inlet body 22 and outlet body 21 and are respectively sealed in a gas-tight manner by seals 32, 32'.

Figure 7:
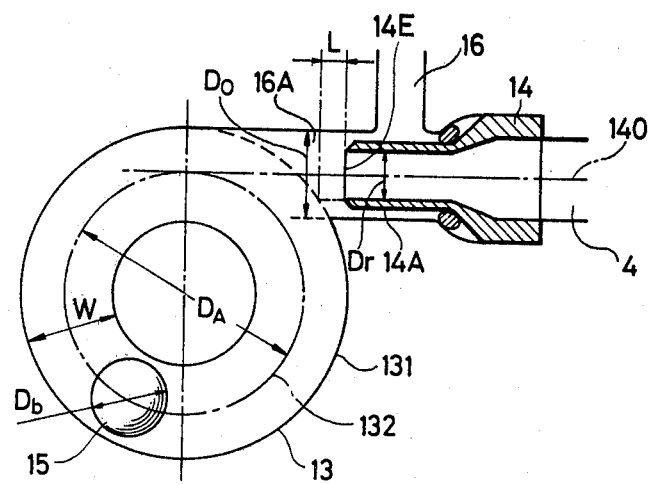
FIG. 7 is a diagramatic illustration of a positioning of an inlet orifice of a flow rate sensor constructed in accordance with the present invention.

FIG. 7 provides an illustration of a preferable arrangement of the fuel that inlet orifice 14 with respect to the annular passage 13 and, according to this figure, a longitudinal center axis 140 of the fuel inlet orifice 14 is substantially tangential to the annular passage 13 and, in particular, to a centerline or center circle 132 of the annular passage 13. The fuel inlet orifice 14 is arranged so that the longitudinal center axis 140 coincides with the longitudinal center axis of the opening area 16A of the outlet passage 16.

Figure 8:
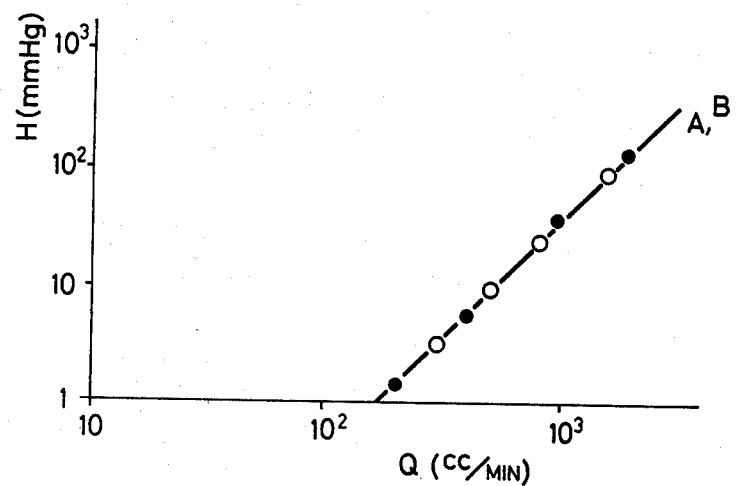
FIGS. 8 and 9 are diagramatic illustrations depicting characteristic data of a flow rate sensor constructed in accordance with the present invention and a convention flow rate sensor.
Figure 9:
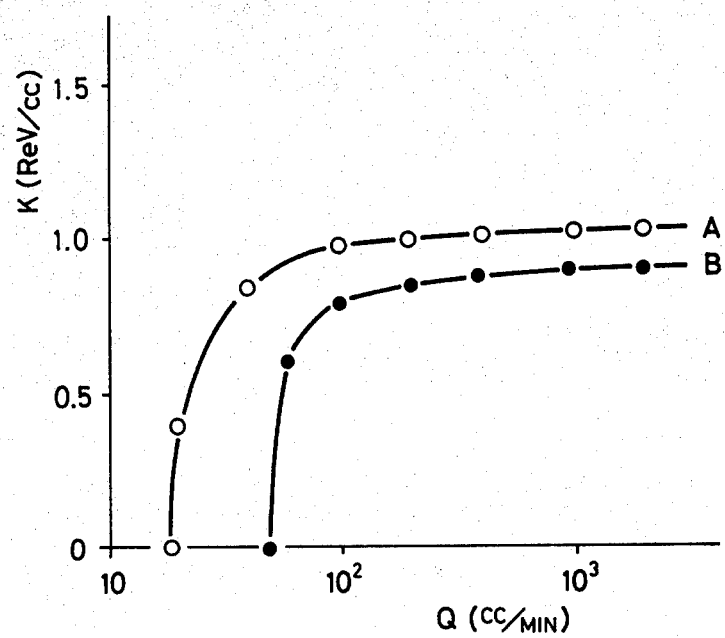

Various experiments were conducted with the flow rate sensor 1 of the present invention, with the flow rate sensor 1 being constructed for use in a motor vehicle having an engine with a displacement of 4,000 cc. FIGS. 8 and 9 provide a graphical illustration of a comparison between a flow rate sensor constructed in accordance with the present invention and a conventional construction such as proposed in, for example, the above-mentioned U.S. Pat. No. 4,157,660.

In FIGS. 8 and 9, the curve designated A illustrates the characteristics of a flow rate sensor 1 of the present invention, with the curve designated B illustrating the flow rate characteristics of a construction such as proposed in U.S. Pat. No. 4,157,660.

In the experiments, the flow rate sensor had an annular passage 13 having a mean diameter $D_A$ (FIG. 7) of 15 mm, a width W of the annular passage of 6 mm, a diameter $D_R$ of a restricted portion of the orifice of 2.5 mm, and a diameter $D_O$ of the opening area 16A of 6 mm. The flow rate sensor of U.S. Pat. No. 4,157,660 was constructed substantially with the same specifications.

As shown in FIG. 8, both flow rate sensors exhibit a substantially equivalent resistance drop with respect to the flow rate. FIG. 9 illustrates that the flow rate sensor 1 of the present invention is readily adapted to sense a flow rate which is down to a much lower level than the conventional flow rate sensor. In an actual running test conducted with an automobile of a class having an engine displacement of 4,000 cc, the flow rate sensor of the present invention showed a sufficiently high sensitivity even during idling and did not adversely affect the performance of the engine during, for example, acceleration and hill climbing.

While, as noted above, at least a portion of the tip or end 14E of the inlet orifice 14 may be disposed in the outer periphery 131 of the annular passage 13, it is also possible to displace the tip or end 14E with respect to the outer periphery by a distance L (FIG. 7).

Figure 10:
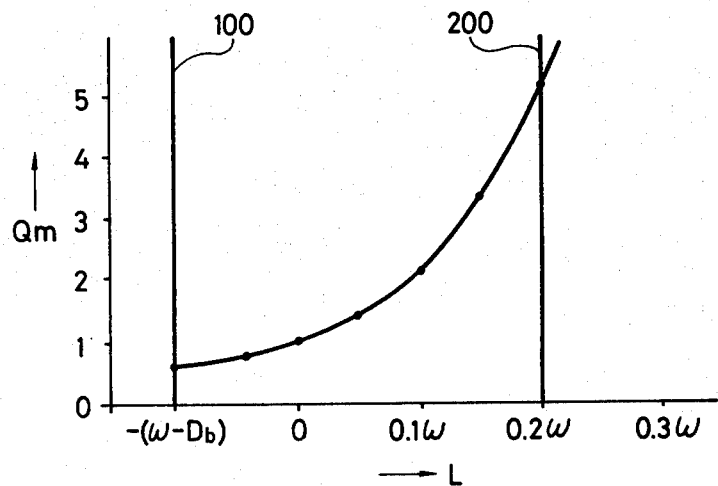
FIG. 10 is a diagramatic illustration depicting characteristic data of flow rate sensors.

In order to determine an optimum range for a positioning of the tip or end 14E of the inlet orifice 14 with respect to the outer periphery 131 of the annular passage 13, additional experiments were conducted, with the results thereof being illustrated in FIG. 10.

In FIG. 10 the lines 100 and 200 define the actual use range of the flow rate sensor 1, with the area of the graph to the left of the line 101 representing a range wherein it was determined that the construction would prevent a circulation of the ball element 15; whereas, the area of the graph to the right of line 200 represents an area of decreasing sensitivity of the flow rate sensor 1. In FIG. 10 $D_b$ represents a diameter of the ball element 15, with W representing a width of the annular passage 13 (FIG. 7).

As shown in FIG. 10, when the distance L equals zero, the flow rate $Q_m$ equals 1 and when the distance L<zero, the flow rate $Q_m$ is very small. However, if the absolute value of the distance L becomes larger than $(W-D_b)$, the ball element 15 does not rotate in the annular passage 13. On the other hand, when the distance L is positive, i.e., greater than 0.2W, the flow rate $Q_m$ becomes relatively large and the sensitivity of the flow rate sensor 1 decreases dramatically. Consequently, it has been determined that an optimum range for the distance L is $-(W-D_b)<L\leq0.2W$.

While we have shown and described only one embodiment in accordance with the present invention, it is understood that the same is not limited thereto but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. A flow rate sensor comprising an annular passage means for enabling a flow of liquid therethrough, a movable member disposed in the annular passage means, an intake passage means for supplying the liquid to the annular passage means, and an outlet passage means disposed concentrically to the intake passage means for enabling the liquid to flow out of the annular passage means about an outer periphery of the intake passage means.

2. A flow rate sensor according to claim 1, wherein means are provided for detecting a movement of the movable element and for providing an output signal of the detected movement.

3. A flow rate sensor according to one of claims 1 or 2 wherein the intake passage means is disposed so as to supply the liquid into the annular passage means in a direction tangential to the annular passage means.

4. A flow rate sensor according to claim 3, wherein the intake passage means includes an inlet orifice terminating in a tip, and in that at least a portion of the tip is disposed at a predetermined distance from an outer periphery of the annular passage means.

5. A flow rate sensor according to claim 4, wherein the predetermined distance is $-(W-D_b)<L\leq0.2W$, wherein L is the predetermined distance, W is a width of the annular passage means, and $D_b$ is a diameter of the movable element.

6. A flow rate sensor according to claim 5, wherein the annular passage means has a circular cross section, and in that the movable element is a ball element.

7. A flow rate sensor according to claim 6, further comprising means for absorbing a pulsation in the liquid supplied to the flow rate sensor.

8. A flow rate sensor according to claim 2, wherein an inlet body and an outlet body are provided, means are provided for attaching the inlet body to the outlet body, the annular passage means is formed by grooves provided in opposing end faces of the inlet and outlet bodies, and means are provided for sealing the opposing end faces of the inlet and outlet bodies.

9. A flow rate sensor according to claim 8, wherein the detecting means includes a light transmitting means mounted in one of the inlet and outlet bodies and a light receiving element mounted in the other of the inlet and outlet bodies.

10. A flow rate sensor according to claim 9, further comprising means for absorbing pulsation in the liquid supplied to the flow rate sensor.

11. A flow rate sensor according to claim 10, wherein the means for absorbing pulsation includes a first pressure chamber means in the inlet body, a second pressure chamber means formed in the outlet body, a resilient membrane means for separating the first pressure chamber means from the second pressure chamber means, means are provided for communicating the first pressure chamber means with the intake passage means, and means are provided for communicating the second pressure chamber means with the outlet passage means.

12. A flow rate sensor according to claim 11, in a driving computer system for a motor vehicle, wherein means are provided for supplying the output signal from the detecting means to the driving computer system.

13. A flow rate sensor according to one of claims 1 or 2, wherein the intake passage means includes an inlet orifice terminating in a tip, and in that at least a portion of the tip is disposed at a predetermined distance from an outer periphery of the annular passage means.

14. A flow rate sensor according to claim 13, wherein the predetermined distance is $-(W-D_b)<L\leq0.2W$, wherein L is the predetermined distance, W is a width of the annular passage means, and $D_b$ is a diameter of the movable element.

15. A flow rate sensor according to one of the claims 1 or 2, further comprising means for absorbing a pulsation in the liquid supplied to the flow rate sensor.

16. A flow rate sensor according to one of claims 1 or 2, in a driving computer system for a motor vehicle, wherein means are provided for supplying the output signal from the detecting means to the driving computer system.

* * * * *